(No Model.)
W. R. BERRY.
COTTON PLANTER AND FERTILIZER DISTRIBUTER.
No. 250,489. Patented Dec. 6, 1881.
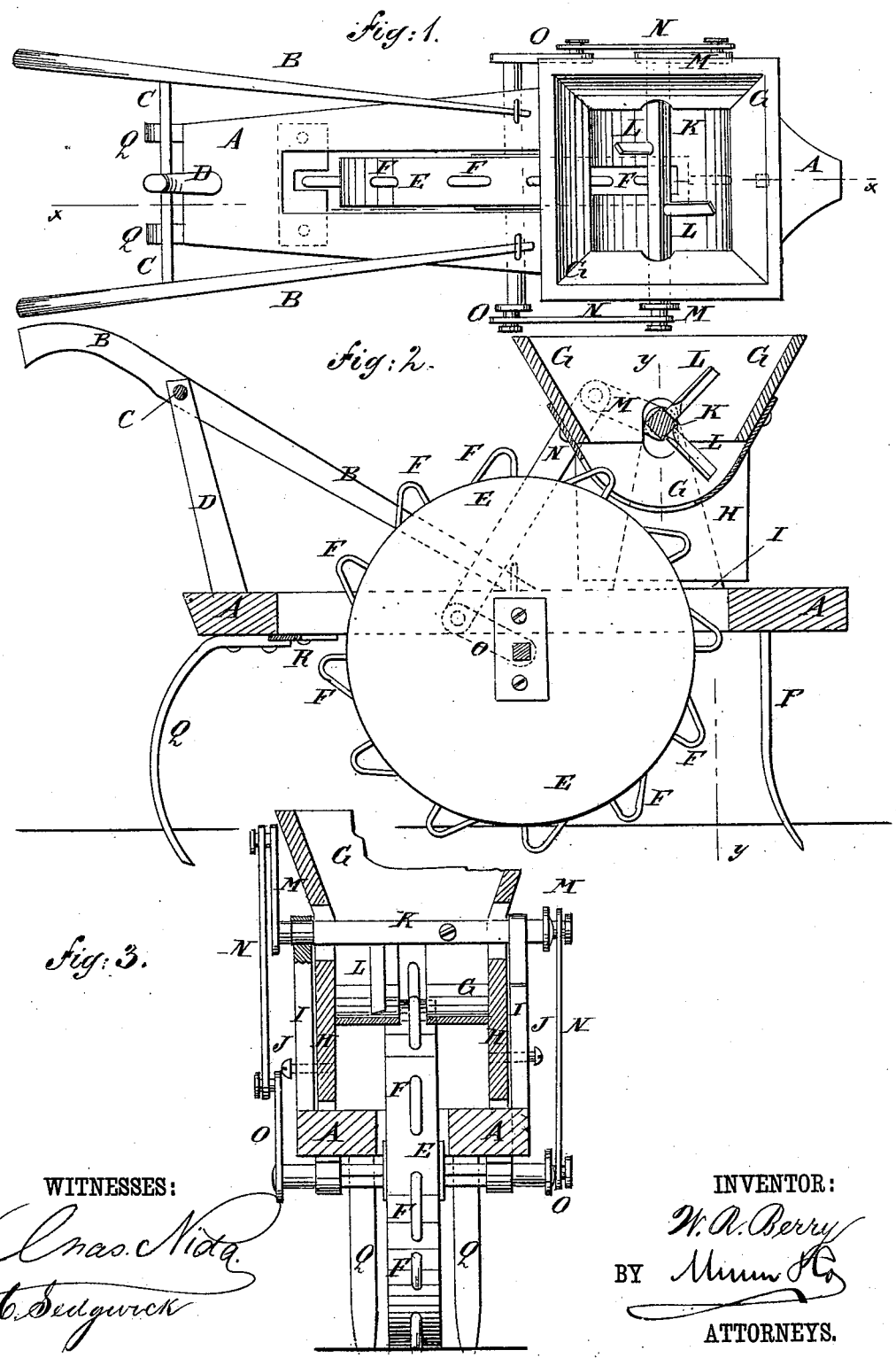
WITNESSES:
INVENTOR:
W. R. Berry
BY
ATTORNEYS.

UNITED STATES PATENT OFFICE.

WILLIAM R. BERRY, OF EASLEY'S STATION, SOUTH CAROLINA.

COTTON-PLANTER AND FERTILIZER-DISTRIBUTER.

SPECIFICATION forming part of Letters Patent No. 250,489, dated December 6, 1881.

Application filed June 21, 1881. (No model.)

*To all whom it may concern:*

Be it known that I, WILLIAM R. BERRY, of Easley's Station, in the county of Pickens and State of South Carolina, have invented a new and useful Improvement in Cotton-Planters and Fertilizer-Distributers, of which the following is a full, clear, and exact description.

Figure 1 is a plan view of my improvement. Fig. 2 is a sectional side elevation of the same, taken through the line $x$ $x$, Fig. 1. Fig. 3 is a sectional front elevation of the same, taken through the line $y$ $y$, Fig. 2.

Similar letters of reference indicate corresponding parts.

The object of this invention is to facilitate the planting of cotton and the distribution of fine fertilizers.

In the accompanying drawings, A represents the frame of the machine. To the middle part of the frame A are attached the forward ends of the handles B, which are connected near their rear ends by a round, C, and are supported at a proper elevation by a standard, D. The lower end of the standard D is attached to the rear end of the frame A, and its upper end is attached to the round C.

To bearings attached to the lower side of the middle part of the frame A is journaled a wheel, E, to the rim of which are attached, or upon it are formed, rounded teeth F, to withdraw the seed or fertilizer from the hopper. The teeth F are formed of wire bent into U form and driven into the rim of the wheel E, the forward arm being driven a little deeper than the rear arm to give the said teeth a forward inclination, as shown in Fig. 2. With this construction the teeth are better adapted to withdraw the seeds or fertilizer than where they consist simply of pins driven in the periphery of the wheel—a construction which is old and well known.

G is the seed-hopper, which is made with a rounded or semi-cylindrical bottom, and has vertical downwardly-projecting ends H, which extend downward at the inner sides of the standards I. The standards I are attached to the forward part of the frame A, and to the said standards I are secured the ends H of the hopper G by screws J, so that the hopper can be adjusted nearer to or farther from the wheel E by loosening the said screws J. The bottom of the hopper is slotted to receive the teeth of the wheel E, so that the said teeth can withdraw the cotton-seed or fertilizer from the hopper G and allow it to drop to the ground.

In bearings attached to the upper ends of the standards I works a shaft, K, which passes through holes or slots in the sides of the hopper G, and has radial arms or fingers L, attached to it within the said hopper G, to agitate the cotton-seed or fertilizer, so that it may pass readily to and through the slot in the bottom of the hopper G.

To the ends of the shaft K are attached two cranks, M, which project at an angle with each other, and to which are pivoted the forward ends of the two connecting-bars N. The rear ends of the connecting-bars N are pivoted to two cranks, O, attached to the journals of the wheel E, which cranks project at an angle with each other in the same manner as the cranks N, so that it will be impossible for the said cranks to become set on their dead-points. By this construction the agitator K L will be operated to keep the cotton-seed or fertilizer stirred up by the advance of the machine.

To the middle part of the forward end of the frame A is attached the standard of a plow, P, to open a furrow to receive the seed or fertilizer. The furrow opened by the plow P is filled and the seed or fertilizer is covered by two plows, Q, attached to the rear ends of the frame A.

To the lower side of the rear part of the frame A is attached a metal plate, R, which is slotted to allow the teeth F of the wheel E to pass through it, so that the said plate will scrape off any soil that may adhere to the said teeth, and thus keep the teeth clean, to cause them to operate properly upon the seed and insure the proper removal of the seed from the hopper. With this construction the plowman can at all times see the seed as it is withdrawn from the hopper G, so that he can always know whether the machine be operating properly.

Having thus described my invention, I claim as new and desire to secure by Letters Patent—

In a fertilizer-distributer and cotton-seed planter, the bearing-wheel E, having peripheral U-shaped teeth F, working in and through a slotted hopper-bottom, for feeding the material to be sown, substantially as shown and described.

WILLIAM RIPLEY BERRY.

Witnesses:
A. W. HUDGINS,
H. J. GIGNILLIAT.